United States Patent Office 2,701,767
Patented Feb. 8, 1955

2,701,767

GEL-FORMING COMPOSITION AND METHOD OF MANUFACTURE

George W. Twieg, Gustine, and Arthur E. Poarch, Mill Valley, Calif., assignors to Avoset Company, San Francisco, Calif., a corporation of Delaware No Drawing. Application November 8, 1951, Serial No. 255,537

20 Claims. (Cl. 99—132)

This invention relates to a gel-forming composition, and more particularly to a dessert gel-forming composition comprising low methoxyl pectin and a salt of an alkaline earth metal adapted to rapidly form a gel of pleasing and desirable texture by the mere addition of cold water thereto.

It is well known in the art to which this invention appertains that partially demethoxylated pectins, or the low methoxyl pectins, have the property of forming gels in water solution in the absence or relative absence of sugar upon the addition to the solution of a calcium salt, or salts of other metals of the alkaline earth series. No difficulty is experienced in causing such gels to form from cold water solution if the low methoxyl pectin is dissolved fully in the water before the addition thereto of the calcium salt. However, when the calcium salt is admixed with the pectin material before the water is added, it has been found necessary to add the mixture to hot water, followed by a time-consuming cooling of the solution to enable gelation to take place. If the mixture is added directly to cold water, or water of sufficiently low temperature to enable gelation to take place, gelation will be initiated before the pectin material has fully dissolved, and such partial and premature gelation prevents further dissolution of the pectin material and results in a mushy or soupy mass as an end product.

In previous attempts to prepare gels from low methoxyl pectin and calcium salts, others in the art have been forced to employ hot water, with its attendant disadvantages, or have utilized two packages of dry materials, which had to be separately dissolved or suspended. Such efforts, to our knowledge, have not been successful from the standpoint of producing a commercially satisfactory product, because of the inconveniences involved in the use of hot water or separated reactants, or because the gels exhibited inferior textures or required excessive time periods to form.

The broad and encompassing object of the present invention is the provision of a one package calcium-inducible gel-forming composition of the low methoxyl pectin type which can be readily dissolved in cold water to form a gel of superior and pleasant texture within a time period of 1–30 minutes, and, preferably, in a period not in excess of about ten minutes.

Other objects and advantages of the invention will be apparent from the following description of the gel-forming composition and its method of manufacture.

In summary, the gel-forming composition of the invention is produced by treating the two principal ingredients, the low methoxyl pectin and the calcium salt, to enhance the rate of solution and hydration of the pectin and confer upon the pectin slower reaction characteristics with respect to the calcium ions and to physically retard the solution of the calcium salt. The treatment of the pectin is accomplished by the use of one of each, or one of either of two groups of low methoxyl pectin modifying agents which have been previously used as additives in pectin type jelly compositions, but it is believed that the compounds of these classes have never been employed in the manner of the present invention. As distinguished from the mere physical addition of these agents to the pectin, as by dry admixture to the powdered pectin, it is necessary that these agents be brought together with the pectin under conditions enabling a reaction between the ingredients, as by dissolving the modifying substances in water along with the pectin, followed by a drying of the solution to obtain the solute material, or by forming a thick paste by mixing the pectin and modifying agents with a quantity of water insufficient to cause complete solution of all the ingredients, followed by a drying of the paste. The treatment of the calcium salt is accomplished by coating the salt particles with a thin layer of a non-toxic substance which is water-dispersible, i. e., having the property of dissolving, or disintegrating, or otherwise breaking up in water, at such a rate that the salt is protected from the water until the pectin is substantially all in solution. It is the combination of the step of modifying the pectin with the step of coating the calcium salt which enables the one package, cold water gel-forming composition of the invention to be obtained.

*The coating of the preferred salt, calcium*

While salts of many divalent metals will produce a gel when added to a solution of low methoxyl pectin, calcium salts are preferred because of their physiological inertness and their general lack of taste-imparting qualities. Since calcium salts of limited solubility in water have superior gel-forming properties, salts of this type are to be preferred. Among the limitedly soluble calcium salts which may be used in the present invention are the following: calcium sulfate, calcium citrate, the mono, di and tri-basic calcium phosphates, calcium carbonate, and calcium tartrate.

The coating material for the salt may be selected from natural vegetable gums, synthetic gums, artificial gums, plastic materials, casein, or gelatin which have the property of being cold water-dispersible. The preferred coating materials are carboxy methyl cellulose, methyl cellulose, gelatin, locust bean gum, gum karaya, and polyvinyl alcohol.

The selected calcium salt is coated as uniformly as possible with the selected coating material, and the coating step may be performed in any of a number of ways. A solution of the coating agent may be sprayed on the salt, and the solvent evaporated, with or without the aid of heat or vacuum, while care is taken to prevent the salt particles from agglomerating, as by rotating the salt particles in a rotary drum. The coating may be accomplished by physically mixing the calcium salt with a solution of the coating agent, evaporating the solvent, and breaking the salt particles apart in a suitable mill. Again, if the selected coating agent has a softening point temperature below that of the salt, the coating of the salt can be effected by mixing the salt and the coating agent together at a temperature above the softening point of the latter, using a rotary drum for this purpose, and subsequently breaking the coated salt particles apart in a suitable mill. The preferred manner of coating the salt is to thoroughly mix the salt with a solution of the coating agent and spray dry this mixture.

The particle size of the coated calcium salt should be such that the salt will not have a marked tendency to either sink or float when added to water; but will dissolve evenly while remaining substantially in suspension. Preferably, the coated salt should be substantially fully passable through a 65 mesh screen.

The following are presented as examples of the procedure followed in the coating of the calcium salts:

1. 400 grams of tri-calcium phosphate were suspended in 1000 ml. of boiling water. 50 grams of low viscosity methyl cellulose were stirred into this suspension, and the mixture was then cooled to about 50° F. under refrigeration. The mixture was stirred thoroughly and spray dried, with the spray drying being controlled to produce substantially moisture-free coated salt particles which were substantially fully passable through a 65 mesh screen.

2. 100 grams of gypsum were suspended in 1000 ml. of boiling water. 100 grams of low viscosity carboxy methyl cellulose were added to this suspension, and the resulting mixture was stirred thoroughly. The mixture was then spray dried, with the conditions of spray drying being controlled so that the dried end product was substantially free of water and was substantially fully passable through a 65 mesh screen.

The coated calcium salt may be further treated so as to improve its desired characteristics, especially when the calcium salt has been coated by a method which involves the breaking apart of the calcium salt particles. In such instances, the coating of some of the salt particles may be incomplete, thus allowing some access of water to the calcium salt in the gel-forming operation before the coating is fully dissolved. In such cases, the desired end properties of the calcium salt may be obtained either by dissolving away the exposed calcium salt or by converting the exposed salt to a highly insoluble or inactive form. Further treatment of the calcium salt for this purpose may follow any one of a number of procedures. For example, if the coating agent for the calcium salt is methyl cellulose, which is insoluble in hot water, the exposed calcium salt may be dissolved away by boiling the coated salt in hot water, or in hot water containing a small amount of hydrochloric acid, followed by a filtration of the solution and a drying of the coated salt in a current of heated air. The exposed calcium salt may be converted to an inactive form by boiling the salt in water containing a soluble tartrate or stearate, or any chemical compound which will convert the exposed calcium salt to a highly insoluble salt or a poorly ionized salt, followed by filtration of the solution and drying of the coated salt in a current of heated air. If the coating agent employed is soluble in hot water, the exposed calcium salt may be removed or converted by similar treatment in a solvent in which the coating agent is insoluble. For most of the coating agents above enumerated, ethyl alcohol is a preferred solvent for the exposed salt. A small amount of hydrochloric acid is preferably added to the ethyl alcohol. For the conversion of the exposed salt to a highly insoluble or inactive form when the coating agent employed is soluble in water, hydroxylamine tartrate is the preferred converting agent.

The following are presented as examples of the procedure followed in the described treatment of the coated calcium salts:

3. 5 grams of the coated calcium salt obtained from the procedure described in Example 1 were stirred into 100 ml. of boiling water. After this mixture was boiled for several minutes, it was suction filtered through a previously heated Büchner funnel and the residue was dried under a current of heated air. The resulting product was somewhat lumpy but was easily broken up by gently rubbing it between the fingers.

4. 5 grams of the product resulting from the procedure set forth in Example 2 were stirred into 200 ml. of boiling ethanol containing 3 grams of hydroxylamine hydrochloride. The resultant mixture was boiled for several minutes and was then suctioned filtered. After being allowed to dry on the filter paper, the residue was readily removed therefrom as a free-flowing white powder.

5. 10 grams of the product resulting from the procedure set forth in Example 1 were stirred into 200 ml. of boiling water containing 5 grams of ammonium tartrate. The mixture was boiled for several minutes, following which it was suction filtered through a previously heated Büchner funnel. After the residue was dried under a current of heated air, the resultant product was readily broken up by a gentle rubbing between the fingers.

*Modifying the low methoxyl pectin*

In order to obtain the one package cold water gel-forming composition of the invention, it is necessary that the low methoxyl pectin material be also modified. The modification of this material is accomplished by dissolving it in water along with a compound from either of two classes of compounds hereinafter set forth, and preferably with one compound of each class, followed by a drying of the solution in any desired manner and subsequent grinding of the resulting product where this is found to be either desirable or necessary.

The first class of compounds which may be dissolved with the low methoxyl pectin material in order to modify it consists of salts of monovalent metals, or metallic ions, and incompletely ionizing, or weak, acids. Included in this class of salts are the sodium, potassium, or ammonium salts of the weak inorganic acids or of any organic acids. The functions of such salts are to provide monovalent metal ions which will associate themselves with the low methoxyl pectin material to hinder polymer formation and thus delay the formation of a gel in the presence of the calcium salt; to provide a slight buffering action against acids and thus hinder acid-induced gelation; and to separate the molecules of low methoxyl pectin and thus provide for a relative increase in the rate of solubility of the pectin material. The preferred salts of this class of compounds are sodium citrate, sodium acetate, and sodium propionate.

The second class of compounds which may be dissolved along with the low methoxyl pectin material consists of salts of monovalent metals, or metallic ions, and the complex acids of phosphorus or ethylene diamine tetra acietic acid, which exert a sequestering action on calcium ions. Compounds of this class are known to the art as calcium sequestrants, and included among them are such compounds as sodium, potassium, or ammonium metaphosphates, polyphosphates, tetraphosphates, tripolyphosphates, hexametaphosphates, and ethylene diamine tetra acetates. The desired function of these salts, over and above those functions mentioned in connection with the first class of compounds, is to sequester calcium ions and thus hinder and slow down the gelation of the low methoxyl pectin material. Preferred compounds of this second class are sodium hexametaphosphate and sodium ethylene diamine tetra acetate.

When a compound from each of the two classes of modifying compounds is dissolved with the low methoxyl pectin material, the total weight of the modifying additives should not, for best results, amount to more than approximately 65% of the weight of the low methoxyl pectin. Optimum results have been obtained when as little as 5% by weight of one additive has been used, but in such cases the weight of the additive of the other class of compounds was about 40% of the weight of the pectin material. In practice, where the total weight of the additives approximated 65% of the weight of the pectin, about equal amounts of the two additives, or about 30% by weight of each, were employed. It is not necessary that an additive of each of the two classes of additive compounds be used. A single additive of either class may be employed provided it is used in sufficient quantity, preferably at least as much as approximately 40% by weight of the pectin material.

After forming a solution of the low methoxyl pectin material and the additive materials, the solution is dried in any conventional manner, such as tray drying, drum drying, spray drying, or vacuum drying. The preferred methods of drying are drum and spray drying, since these methods make it unnecessary to subject the solute material to any considerable amount of grinding in order to obtain the preferred particle size. As was the case with the coated calcium salt, the preferred particle size for modified low methoxyl pectin material is such that the pectin material will be substantially fully passable through a 65 mesh screen.

The following are presented as examples of the procedure followed in the modifying of the low methoxyl pectin material:

6. 100 grams of an alkaline hydrolyzed citrus pectin having an equivalent weight of about 450 were dissolved in 500 ml. of boiling water together with 30 grams of sodium hexametaphosphate and 35 grams of sodium acetate. The resulting viscous solution was drum dried under conditions producing a substantially moisture-free product. The dried product was then ground in a mill to enable it to pass substantially completely through a 100 mesh screen.

7. 100 grams of an alkaline hydrolyzed citrus pectin having an equivalent weight of about 440 were dissolved in 500 ml. of boiling water together with 6 grams of sodium hexametaphosphate and 8 grams of sodium citrate. The resulting viscous solution was spray dried under conditions producing a substantially moisture-free product which would pass substantially completely through a 100 mesh screen.

8. 200 grams of a low methoxyl pectin, obtained by dilute alkaline hydrolysis of pectin and having a methoxyl content of 3.5%, were mixed with 30 grams of sodium hexametaphosphate and 35 grams of sodium citrate. The resulting mixture was dissolved in 1,000 ml. of hot water, and the solution was spray dried to produce a dry powder substantially free of moisture and passable through a 65 mesh screen.

The low methoxyl pectin material of Examples 6 and 7 was produced by the California Fruit Growers Exchange of Ontario, California, according to the process set forth in the patent to Bryant 2,480,710. This low methoxyl pectin material is produced by partial demethoxylation with ammonia in an alcoholic system or with concentrated aqueous ammonia. In the process of preparing this material, some of the methoxyl groups are replaced with amide groups rather than free-carboxyl groups, and the end product has been termed to be a pectinic acid amide.

The low methoxyl pectin of Example 8 was produced by demethoxylation in a fixed alkali or dilute aqueous ammonia system. The resulting low methoxyl pectin contains no acid amide groups. The equivalent or combining weight of the pectin material used in Example 8 was approximately 270, the figure corresponding to a methoxyl content of about 3.5%.

Preparing the gel-forming mixture

The final product, the one package powdered mixture adapted to rapidly form a gel upon the addition thereto of cold water, is made up by thoroughly mixing the modified low methoxyl pectin material with a relatively minor portion of the coated calcium salt, with suitable flavoring and coloring agents, and food additives, if desired, being added to the mixture. Conventionally used flavoring agents comprise sugar, citric or tartaric acid, fruit or other flavors, and pure food colors. A preferred formula for this gel-forming composition is as follows:

| Material: | Amount |
|---|---|
| Sugar | 75–100 parts. |
| Modified low methoxyl pectin | 3–8 parts. |
| Citric acid | 2–6 parts. |
| Coated calcium salt | 1–4 parts. |
| Fruit oil | 0–.1 part (or according to choice). |
| Food color | 0–.03 part (or according to choice). |

The following are presented as examples of the making of gels from the gel-forming composition of the invention:

9. 3 grams of the modified low methoxyl pectin obtained according to the Example 6 were mixed with 25 grams of sugar, 1.2 grams of citric acid, and 1 gram of the coated calcium salt obtained according to Example 4. The resulting powdered mixture was stirred into 120 ml. of cold water, and the solution was allowed to stand for 10–15 minutes. The resulting gel, when deposited upon a plate, proved to be capable of holding its shape, and, when cut, showed a pleasing tender texture, with very little tendency to bleed.

10. 2.5 grams of the modified low methoxyl pectin material obtained according to Example 7 were mixed with 25 grams of sugar, 1.1 grams of citric acid, 1 gram of the coated calcium salt obtained according to Example 3, 0.2 gram of pure fruit flavor, and 0.02 gram of pure food color. The resulting mixture was stirred into 120 ml. of cold water, and about 20 grams of mixed canned fruits were added. In approximately 5 minutes' time, the resulting gel was deposited upon a plate, and it proved to have a very pleasing texture and flavor.

11. 3 grams of the modified low methoxyl pectin material obtained according to Example 8 were mixed with 1.0 gram of citric acid, 25 grams of sugar, and 0.8 gram of coated calcium salt. This mixture upon being stirred into 125 ml. of cold water formed a very firm gel within a few minutes' time.

12. 2.4 grams of the modified low methoxyl pectin obtained according to Example 6 were mixed with 23 grams of sugar, 1.3 grams of citric acid and 0.8 gram of the coated calcium salt obtained according to Example 2. The resulting mixture was stirred into 120 ml. of cold water. The resulting gel exhibited a tender and pleasing texture.

From the foregoing it will be seen that the subject invention enables the production of a single package gel-forming composition of the calcium-sensitive partially demethoxylated type which can be added to cold water to form a very superior gel within a short period of time. While certain specific examples, by way of embodiments of the invention have been set forth, it is to be understood that all substantial equivalents of said embodiments are within the scope of the invention.

What is claimed is:

1. A dry powdered mixture adapted to form an edible gel upon the addition thereto of water comprising the solute obtained from an aqueous solution of: a partially demethoxylated pectin, a monovalent metal salt of a weak acid, and a monovalent metal salt of a complex acid of phosphorus; and a calcium salt of limited solubility in water coated with a water-dispersible material.

2. The mixture of claim 1 in which: said pectin is a pectinic acid amide having a combining weight of about 450; said salt of a weak acid is sodium acetate; said salt of a complex acid of phosphorus is sodium hexametaphosphate; said calcium salt is calcium sulphate; and said coating for the calcium salt is carboxy methyl cellulose.

3. The mixture of claim 2 wherein the amount by weight of said salts in said solute is about 5–65% of the weight of said pectin material, and wherein the weight proportion in said mixture between said solute and said coated calcium salt is approximately 2–3 parts of solute to one part of coated salt.

4. The mixture of claim 3 in which the particle size of the components of said mixture is such as to enable the mixture to pass substantially completely through a screen having about 65 mesh per square inch.

5. The mixture of claim 1 in which: said pectin is a pectinic acid amide having a combining weight of about 450; said salt of a weak acid is sodium citrate; said salt of a complex acid of phosphorus is sodium hexametaphosphate; said calcium salt is tri-calcium phosphate; and said coating for the calcium salt is methyl cellulose.

6. The mixture of claim 5 wherein the amount by weight of said salts in said solute is about 5–65% of the weight of said pectin material, and wherein the weight proportion in said mixture between said solute and said coated calcium salt is approximately 2–3 parts of solute to one part of coated salt.

7. The mixture of claim 6 wherein the particle size of the components of said mixture is such as to enable the mixture to pass substantially completely through a screen having about 65 mesh per square inch.

8. The mixture of claim 1 in which: said pectin is partially demethoxylated in a dilute alkaline system and has a methoxyl content of about 3.5%; said salt of a weak acid is sodium citrate; and said salt of a complex acid of phosphorus is sodium hexametaphosphate.

9. A dry powdered mixture adapted to form an edible gel upon the addition thereto of water comprising the solute obtained from the drying of an aqueous solution of a partially demethoxylated pectin and a monovalent metal salt of a weak acid, and a calcium salt of limited solubility in water.

10. The mixture of claim 9 in which the amount by weight of said monovalent metal salt in said solute is about 5–65% of the weight of said pectin material.

11. A dry powdered mixture adapted to form an edible gel upon the addition thereto of water comprising the solute obtained from the drying of an aqueous solution of a partially demethoxylated pectin and a monovalent metal salt of a complex acid of phosphorus, and a calcium salt of limited solubility in water.

12. The mixture of claim 11 in which the amount by weight of said monovalent metal salt in said solute is about 5–65% of the weight of said pectin material.

13. An edible gel comprising the product resulting from the reaction in water of a solute, obtained from the drying of an aqueous solution of a calcium-sensitive partially demethoxylated pectin and a monovalent metal salt derived from one of the group of materials consisting of weak acids and the complex acids of phosphorus, with a limitedly soluble calcium salt.

14. The edible gel of claim 13 wherein the monovalent metal salt constituent of said solute amounts to 5–65% by weight of the pectin constituent, said gel containing 3–8 parts of said solute, 1–4 parts of said calcium salt, and comprising, further, 75–100 parts of sugar, 2–6 parts of citric acid, and minor amounts of fruit flavor and food color agents.

15. In a gel-forming composition of the calcium-sensitive type; a mixture of solute materials obtained from the drying of an aqueous solution containing as a solute a partially demethoxylated pectin and a monovalent metal salt derived from one of the group of materials consisting of weak acids and the complex acids of phosphorus.

16. In a gel-forming composition containing a calcium-sensitive partially demethoxylated pectin; a calcium salt of limited solubility in water coated with a cold water-dispersible material.

17. A composition of matter consisting of a solute obtained from the drying of an aqueous solution having as its solute phase calcium-sensitive partially demethoxylated pectin and a monovalent metal salt of at least one of the group consisting of weak acids and the complex acids of phosphorus.

18. A method of producing a gel-forming composition comprising dissolving a calcium-sensitive partially demethoxylated pectin in water in company with a monovalent metal salt of at least one of the group consisting of weak acids and the complex acids of phosphorus, drying the solution to obtain the solute phase thereof, and mixing said solute and a calcium salt together in relatively discrete particle form.

19. A method of producing a gel comprising dissolving a calcium-sensitive partially demethoxylated pectin in water in company with a monovalent metal salt of at least one of the group consisting of weak acids and the complex acids of phosphorus, drying the solution to obtain the solute phase thereof, mixing said solute and a calcium salt together in relatively discrete particle form, and adding said mixture to cold water.

20. A method of modifying the gel-forming and water solubility characteristics of calcium-sensitive partially demethoxylated pectin comprising dissolving said pectin in water together with a monovalent metal salt of at least one of the group consisting of weak acids and the complex acids of phosphorus, and drying said solution to obtain the solute mixture thereof.

References Cited in the file of this patent

UNITED STATES PATENTS

| | | |
|---|---|---|
| 1,827,794 | Leo | Oct. 20, 1931 |
| 1,827,991 | Leo | Oct. 20, 1931 |
| 2,207,299 | Mnookin | July 9, 1940 |
| 2,233,574 | Baker et al. | Mar. 4, 1941 |
| 2,559,338 | Barch | July 3, 1951 |